Figure 1:
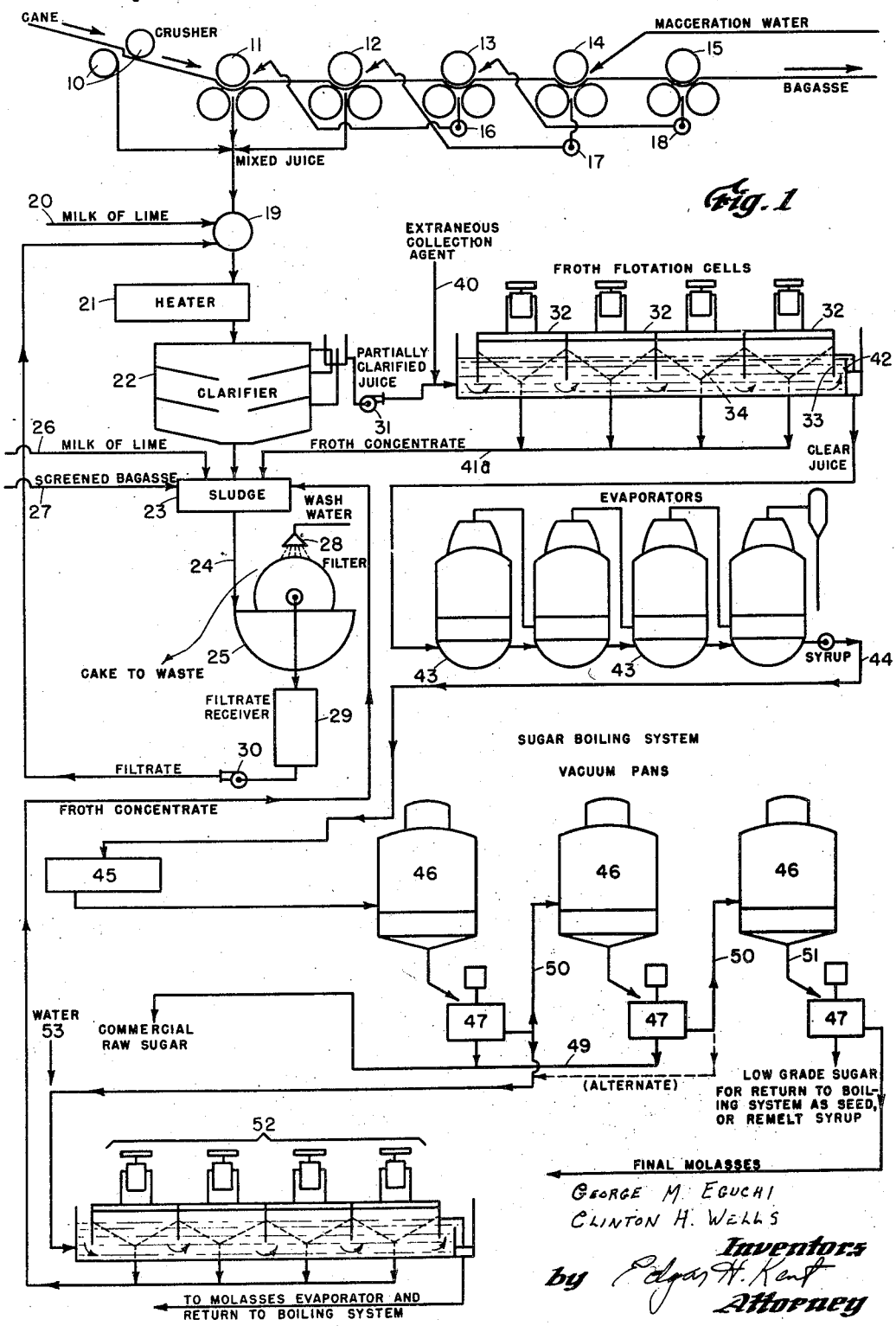

Aug. 8, 1950 G. M. EGUCHI ET AL 2,518,296
SECONDARY CLARIFICATION OF SUGAR SOLUTIONS
Filed July 23, 1949 2 Sheets-Sheet 2

GEORGE M. EGUCHI
CLINTON H. WELLS
Inventors
by Edgar H. Kent
Attorney

Patented Aug. 8, 1950

2,518,296

UNITED STATES PATENT OFFICE 2,518,296

SECONDARY CLARIFICATION OF SUGAR SOLUTIONS

George M. Eguchi and Clinton H. Wells, Honolulu, Territory of Hawaii, assignors to Hawaiian Pineapple Company, Limited, Honolulu, Territory of Hawaii, a corporation of Hawaii Application July 23, 1949, Serial No. 106,474

10 Claims. (Cl. 127—48)

Our invention concerns improvements in the clarification of sugar solutions. It is considered especially valuable as applied to sugar cane juice, in which connection it will be particularly described, but is not limited thereto as it may be applied to beet sugar juice, for example, although not necessarily with equivalent results.

In the process of manufacturing raw sugar from sugar cane, the mixed mill juice, obtained by crushing the cane in a series of roller mills, is limed to pH 8.0–8.5, heated to 200° F. or above, and passed to settling tanks, usually of the continuous type. The settlings are limed to a pH somewhat above that used for the raw juice, bagasse screenings are added as a filter-aid and the slurry is filtered on rotary vacuum filters, or in filter presses. The filtrate is returned to the raw mill juice entering the process. The juice from the tanks goes directly to multiple effect evaporators, without filtration or other treatment, where it is concentrated to the consistency of syrup prior to further concentration and crystallization of the sugar in vacuum pans.

This so-called "clarified" juice is never a perfectly clear solution, the degree of turbidity varying with operating conditions, growing conditions in the field, cane variety, contamination of the harvested cane with soil and leaf material, and other factors. The colloidal turbidity of the clarified juice is indicated by gravity filtration tests which usually show filtration rates ranging from 2 to 20% of the rate of a refined sugar solution of the same density under the same test conditions. This incomplete clarification has always presented a serious problem to the raw sugar industry. The suspended matter carried into the syrups from which the sugar is crystallized reduces the quality of the raw sugar produced and makes the refinery operations more difficult and costly. Furthermore, the suspended matter presents serious problems to the raw sugar factory in the crystallization and centrifuging of the low grade boilings of sugar by reducing the yield of sugar and increasing the time required for crystallization and purging in the centrifugals. In the past, no practical and economical means has been found for improving the clarity of the juice sent to the evaporators, although much experimental effort has been expended in that direction. In recent years the clarification problem has become particularly acute as a result of mechanical harvesting methods and the cultivation of disease resistant varieties of cane, some of which yield juices having very poor clarification characteristics.

The substances in cane juice which resist sedimentation in settling tanks and continuous clarifiers, and therefore appear as turbidity in the clarified juice, include such materials as minute particles of cane fiber, charred leaf particles, nitrogenous substances of albuminoid nature, cane waxes and oils, resinous or gum-like substances, and colloidal clay. Most of these materials have gas adhesive or water repellent properties; others, such as colloidal clay and cane fiber, may acquire gas adhesive coatings through the precipitation of albuminoids upon their surfaces during the liming, heating and clarification operations.

Consideration of the chemical and physical properties of the substances making up the turbidity of clarifier effluent suggested that a selective classification takes place in the clarifier and that the majority of the materials escaping sedimentation, to appear as turbidity in the clarified juice, possess one property in common—that of being capable of attaching to gas bubbles. If this assumption were correct, it should then be possible to remove the turbidity by froth flotation. Subsequent tests with a sub-aeration type of froth flotation unit demonstrated that the turbidity can be removed as a froth concentrate, producing a substantially clear juice and advancing the gravity filtration rate to a point approaching that of a refined sugar solution of the same density.

The introduction of froth flotation into the raw sugar process as a means of secondary clarification involves no major changes in the flow plan. In a typical installation the juice leaving continuous clarifiers may be passed through a series of flotation cells en route to the evaporators. The froth concentrate may be added to the clarifier sludge for filtration on rotary vacuum filters; it may be separately filtered with a suitable filter-aid; or it may be applied to the surface of the crushed cane blanket passing through the roller mills. Standard sub-aeration type of flotation units, as developed for mineral concentration, may be used, providing sufficient cell capacity to give an adequate retention period for the degree of further clarification desired. The temperature and pH of the juice as it flows from the clarifiers (ordinarily 180°–190° F. and 7.0–7.6 pH) are suitable conditions for froth flotation. Heating coils may be installed in the flotation cells to maintain or adjust the temperature during aeration for the purpose of keeping the froth in an active, fragile, non-persistent condition. Natural constituents of cane juice provide sufficient frothing agent.

Normally a very satisfactory improvement in clarity and filtration rate is obtained without any preliminary treatment of the juice entering the flotation unit since most of the substances contributing to clarifier juice turbidity are gas adhesive or have acquired gas adhesive coatings during defecation and clarification. However, under abnormal conditions, resulting from the grinding of damaged cane or cane heavily contaminated with certain types of colloidal clay soil, it may be desirable to supplement the natural gas adhesive coating materials in raw juice with an extraneous collecting agent, to be added to the clarifier effluent prior to or in the course of froth flotation. The collecting agents suitable for this purpose may, in some cases, be the same as materials long recognized as having some value in the coagulation and clarification of sugar juices. However, their use herein is for the purpose of particle coating with a gas adhesive film rather than for coagulation, and the quantity required for this purpose is generally insufficient to bring about coagulation. Collecting agents suitable for this purpose are, in general, similar in nature to the gas adhesive substances present in raw cane juice, e. g., nitrogenous materials having the properties of albuminoids, resins, waxes and vegetable oils. As a matter of convenience, the collecting agent added may be derived from sources other than cane but having the physical and chemical properties characteristic of the substances just indicated. As a specific example, a mechanically refined soybean protein is effective on clarifier juice of abnormal turbidity when added at the rate of .003 to .008% on the weight of the juice.

If desired, our secondary clarification may be applied to molasses, instead of or in addition to the clarifier effluent, as a means of improving the crystallization and centrifugal purging of the low grade boilings in the sugar factory. For this purpose the molasses must be diluted with water or juice to a density suitable for producing the fragile, active bubble type of froth which is essential to satisfactory collection and concentration in froth flotation. The degree of dilution required will vary with the quality of the molasses but must be sufficient to substantially reduce the viscosity of the solution.

Figure 2:
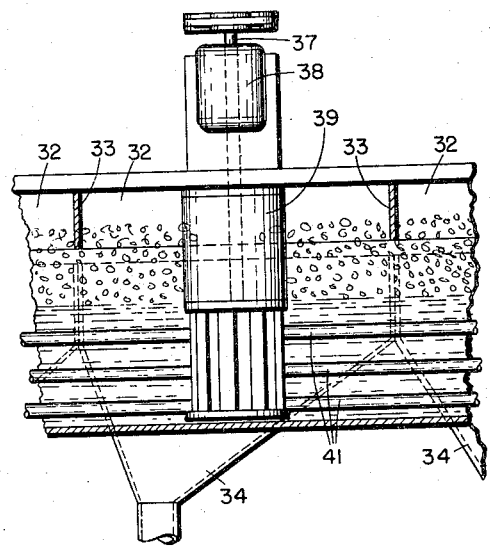
Figure 3:
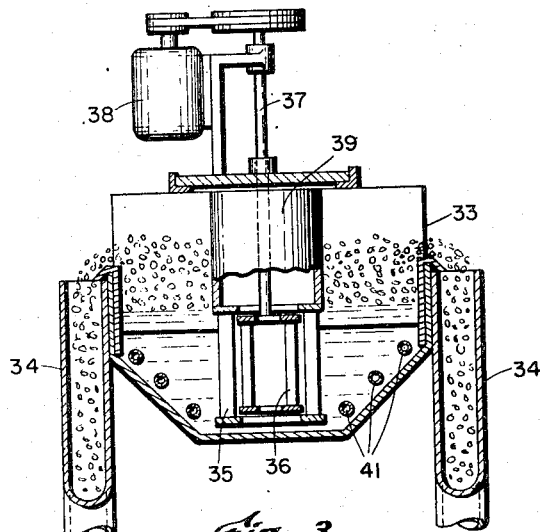

The practice of our invention will be better understood from the following description which will proceed with reference to the accompanying drawings in which Fig. 1 is a flow diagram and Figs. 2 and 3 illustrate one type of flotation cell applicable to the invention, Fig. 2 being a side elevation in section and Fig. 3 being a section at right angles to the section of Fig. 2.

Referring to the drawings, the cane from the fields, after preliminary classification, if necessary, is passed as a blanket between crusher rolls 10 of a mill train and thence through a series of 3-roll mills 11—15. Maceration water is added at a point just beyond rolls 14. The pressed cane or bagasse may be used as fuel in boiler furnaces. Pumps 16, 17 and 18 supply maceration liquid applied to the bagasse blanket leaving the roll mills.

Mixed juices from the crusher rolls 10 and the 3-roll mills are charged to a tank 19 wherein they are mixed with milk of lime introduced via line 20. The limed juice having a pH within the limits previously indicated is passed to a heater 21 wherein it is heated to a temperature between 200° F. and its boiling point. On leaving the heater, the juice is introduced into a clarifier or defecator 22 which may be, for example, of the "Dorr" or "Graver" type. The operation of such clarifiers is well understood by those skilled in this art and accordingly need not be described in detail here.

The settlings from the clarifier are conveyed to a sludge tank 23 connecting via line 24 with a filter 25 indicated as of the rotary vacuum type. Prior to passage of the sludge to the filter, additional lime is added through line 26. The pH of the slurry fed to the filter is usually of the order of 8.5–9.0. The screened bagasse 27 facilitates the subsequent filtration. Before being passed to waste, the filter cake is washed with water introduced through a spray head 28. Filtrate and wash water collected in the receiver 29 is cycled by means of pump 30 to the mixing tank 19.

The partially clarified juice representing the effluent of the clarifier 22 is delivered by a pump 31 to a froth flotation unit made up of cells 32 delineated by baffles 33 terminating at a point somewhat above what appears as the common floor of the cells. The temperature of the juice entering the feed box to the left of the first cell may be about 185° F., for example, and the pH about 7.3.

Each cell (see Figs. 2 and 3) comprises a chute 34 on either side thereof, the chutes receiving the froth concentrate. The overflow lips of the chutes, as well as the baffles 33 should be made adjustable so that the depth of the froth may be varied as necessary or desirable. Centrally within each cell is a rotary type agitator comprising a stator 35 and a rotor 36, the rotor shaft 37 being powered by a motor 38, the power transmission being by belt and pulley. Mounted above the stator and rotor is an annular shield 39 opening to the atmosphere. In operation, air drawn into the agitator is broken down into fine bubbles which become partially dissolved in the pressure area ahead of the rotor blades and which are precipitated as minute bubbles charged with water vapor in the area of partial vacuum behind these blades.

Our invention, it is to be understood, is not predicated for its validity on any particular type of flotation equipment, it being necessary only that the equipment allow for introduction of air bubbles below the surface of the juice and that it include means for agitating the juice in the area of the air introduction without causing surging or swirling at the surface of the juice. Gases and gas mixtures other than air may, of course, be used.

Where it is necessary to use an extraneous collection agent, we ordinarily add the collection agent at a point mediate the pump 31 and the feed box of the flotation unit, line 40 being provided for this purpose. The liquid level in the flotation unit is normally about as indicated. The residence time of the juice in each cell is a variable factor depending upon the extent of clarification desired or required. With a ten minute retention period, we have consistently increased the gravity filtration rate of the juice to a rate approaching that of refined sugar of the same density as the clarifier effluent. Steam coils 41 allow for heating of the juice, should that be desirable to the end of obtaining more optimum froth bubble structure.

The froth overflowing the first cells of the series is well loaded with collected materials. It condenses to a dark brown slurry which is practically unfilterable without the addition of filter aids. In the last cells of the series the froth becomes lighter in color and less heavily loaded and the bubbles become more fragile, resulting in a somewhat shallower froth depth, a condition that may be compensated for in some degree by allowing the temperature of the juice in the last cells to drop or by increasing the speed of the agitators.

Disposal of the froth concentrate and recovery of sugar values therefrom may be accomplished by one or more of several methods. After satisfactory development of the flotation operating technique the volume of the concentrate is a small percentage of the total flow of juice, usually of the order of 3%. Although the concentrate alone is practically unfilterable, advantage can be taken of the surface-active, surface-coating properties of the suspended substances in the concentrate to render it suitable for filtration. These substances readily adhere to and coat fibrous and cellular materials such as the fine screened bagasse or exhausted cane residue from the roller mills which is in general use as a filter aid for sludge from continuous clarifiers. When sufficient filter capacity is available in the factory the concentrate may be added to the clarifier sludge for filtration, or after suitable addition of filter-aid it may be applied to the surface of the clarifier sludge cake on the rotary vacuum filters. Where the existing factory filter equipment is inadequate the concentrate may be handled on a separate filter, after addition of a suitable fibrous or other filter-aid. An alternate method is the application of the concentrate to the surface of the crushed cane blanket moving through the roller mill train at a point where subsequent maceration and crushing will insure extraction of the sugar contained in the concentrate. In the system of Fig. 1, the froth concentrate is shown as passed via line 41 to the sludge collection vessel 23.

The liquid level in the flotation unit is controlled by an adjustable weir 42. Clear juice from the weir chamber is passed through evaporators 43 which serve to reduce it to a syrup of a density ordinarily of the order of 60–65 Brix. The evaporators per se form no part of our invention and, as their operation is well understood, it need not be described here.

The syrup from the evaporators is crystallized by further evaporation in vacuum pans 46 served by tank 45 and the sugar crystals are separated from the mother liquor or molasses in centrifugals 47.

Sugar boiling systems, of course, vary as to detail in different factories. However, a typical system involves three separate boilings with centrifugal separation of sugar crystals from the molasses from each boiling. According to the most simple and direct system, the syrup from the evaporators is concentrated to the graining point in the vacuum pan, the crystals being built up to suitable size by controlled feeding of additional syrup to the boiling "massecuite" in the pan. The finished massecuite is discharged to a mixer, not shown, of conventional type positioned mediate the vacuum pan and the centrifugal 47. The raw sugar crystals discharged by the centrifugal via line 49 are dried and bagged for shipment to the refiner, while the mother liquor or molasses is returned to the vacuum pan via line 50 wherein it is again boiled to grain. The finished second massecuite is similarly separated by the centrifugal into raw sugar crystals and a second molasses, whereafter a final boiling of the second molasses is made in the vacuum pan. Due to the accumulation of non-sugars in this low grade boiling, the final massecuite is discharged via line 51 into a crystallizer, not shown, where before being passed to a centrifugal it is allowed to cool slowly in order to increase the yield of sugar. The products of the last centrifugation are a final molasses and a low grade sugar which, being unsuited for refining, is normally commingled with the evaporator syrup to form a seed magma for starting the graining in the first and second boilings.

As indicated hereinbefore, it is possible to delay the froth flotation and apply it only to the materials that are the most difficult to crystallize and purge, namely, first or second molasses; or it may, in some cases, be desirable to subject the molasses to a supplementary flotation in order to remove colloidal solids which have separated as a result of the concentration of non-sugars taking place during boiling and the removal of sugar crystals. In either event, the molasses may be passed through a flotation unit 52 which may be identical in point of general construction with the first flotation unit and having a cell capacity adequate to provide the necessary retention period for the quantity of molasses available. Dilution of the molasses necessary in order to reduce its viscosity may be accomplished with water admitted via line 53 or alternatively with juice from the clarifier 22. Dilution to a Brix of 20–25 is generally sufficient. The diluted molasses may be treated, for example, at a temperature of 180–190° F. The froth concentrate produced by the molasses flotation may be handled in the manner of the froth concentrate from the first flotation unit, i. e., it may be passed to the sludge vessel 23, as shown, or, after addition of a filter aid, it may be separately filtered or it may be spread upon the surface of the cake on the vacuum filter 25. The thus diluted and clarified molasses, after evaporation to a syrup density in a suitable molasses evaporator or concentrator, not shown, is returned to the boiling system at the proper point as indicated by its purity.

The benefits to be derived from our invention as applied to sugar can juice, based upon actual tests and analyses of the juices before and after flotation, may be summarized as follows:

(1) Production of a substantially clear juice.
(2) Removal of suspended matter and colloidal substances known to have detrimental effects upon the quality of the raw sugar produced and upon factory operations associated with the crystallization and recovery of sugar from molasses.
(3) A small but nevertheless significant increase in the purity of the juice.
(4) A significant reduction in the viscosity of syrups, a difference that is obviously magnified as successive crops of sugar are removed and the non-sugars increase in concentration in the molasses.
(5) A small reduction in ash content of the juice.

Translated into more practical terms these advantages mean:

(1) An increased factory yield of raw sugar.
(2) Raw sugar of higher purity and better keeping qualities.
(3) Advantages to the refinery in terms of improved filtration.
(4) Savings in time required for crystallizing and centrifuging the low grade boilings.
(5) Reduction of the loss of sugar in final molasses.

The present invention is not to be confused with flotation schemes previously proposed by others in the industry. The minute particle size of the substances involved in clarifier juice turbidity precludes the possibility of mechanically rafting them to the surface. Our process is one of true gas adhesion, as distinguished from processes in which a flocculent precipitate, resulting from the addition of a reagent and presenting large surface area, is floated to the surface by rising air bubbles in a body of liquid maintained in a completely quiet state. In a sub-aeration type flotation unit as contemplated by the invention the juice in the rotor-stator zone is maintained in a vigorous state of agitation and recirculation, a condition which would prevent the formation of any flocculent precipitate of large surface area. Bubbles rise to the surface with turbidity materials attached thereto as minute particles, and enrichment of the concentrate takes place in the active bubble column above the juice by convergence, merger, shrinkage, and rupture of bubbles at the surface of the froth.

Our invention, as previously stated, may be employed in the clarification of sugar juices other than cane sugar juice, particularly beet diffusion juice which, like cane sugar juice, contains substances precipitable by lime which are gas adhesive.

Various changes and modifications in the system of apparatus disclosed herein can, of course, be made without departing from the spirit and scope of the invention.

We claim:

1. In the treatment of a sugar solution containing turbidity-imparting gas adhesive substances, said solution or a parent liquid from which it was directly derived having been subjected to settling following chemical treatment causing precipitation of impurities separated by the settling, the improvement which comprises introducing minute gas bubbles into the solution at a point well below the surface thereof with violent agitation of the solution in the area of the gas introduction, the agitation being substantially confined to such area and not causing swirling or surging at the surface of the solution, and separating the resulting froth from the surface of the solution.

2. Method of processing raw sugar cane juice comprising subjecting the juice after chemical treatment causing precipitation of contained impurities to settling and thereafter introducing minute gas bubbles into the thus partially clarified juice at a point well below the surface thereof with violent agitation of the juice in the area of the gas introduction, the agitation being substantially confined to such area and not causing swirling or surging at the surface of the juice, and separating the resulting froth containing impurities not removed by the settling from the surface of the juice.

3. In the recovery of raw sugar from sugar juice by a process comprising settling of the juice following chemical treatment causing precipitation of impurities and further comprising separation of sugar crystals from molasses, the molasses being derived from evaporation, crystallization, and centrifugation of the settled juice, the improvement which resides in diluting the molasses and thereafter introducing minute gas bubbles into the molasses at a point well below the surface thereof with violent agitation of the molasses in the area of the gas introduction, the agitation being substantially confined to such area and not causing swirling or surging at the surface, and separating the resulting froth from the surface of the molasses.

4. Method of processing raw sugar cane juice comprising liming the juice to pH 8.0–8.5 to precipitate contained impurities, heating the juice to a temperature between 200° F. and its boiling point, subjecting the limed and heated juice to settling to separate the precipitated impurities and thereafter introducing minute air bubbles into the juice at a point well below the surface thereof with violent agitation of the juice in the area of the air introduction, the juice at such stage having a temperature of from 180–190° F. and a pH between 7.0 and 7.6, the agitation being substantially confined to such area and not causing swirling or surging at the surface of the juice, and separating the resulting froth containing impurities not removed by the settling from the surface of the juice.

5. Method according to claim 4 further characterized in that an extraneous collection agent is added to the juice to enhance the effectiveness of the froth flotation, said collection agent being of a nature similar to the gas adhesive substances naturally present in the juice.

6. Method according to claim 5 where the extraneous collection agent is soy bean protein.

7. In the recovery of raw sugar from sugar cane juice by a process comprising settling of the juice following liming and heating of the juice and further comprising separation of sugar crystals from molasses, the molasses being derived from evaporation, crystallization, and centrifugation of the settled juice, the improvement which resides in diluting the molasses to a Brix of 20–25 and thereafter introducing minute air bubbles into the molasses at a point well below the surface thereof with violent agitation of the molasses in the area of the air introduction, the agitation being substantially confined to such area and not causing swirling or surging at the surface, and separating the resulting froth from the surface of the molasses.

8. The improvement of claim 7 further characterized in that the molasses during the froth flotation has a pH of 7.0–7.6 and is maintained at a temperature within the range of 180°–190° F.

9. Method according to claim 8 further characterized in that an extraneous collection agent is added to the molasses to enhance the effectiveness of the froth flotation, said collection agent being of a nature similar to the gas adhesive substances naturally present in the molasses.

10. Method according to claim 9 where the extraneous collection agent is soy bean protein.

GEORGE M. EGUCHI.
CLINTON H. WELLS.

REFERENCES CITED

The following references are of record in the file of this patent:

UNITED STATES PATENTS

| Number | Name | Date |
| --- | --- | --- |
| 1,052,195 | Wedderburn | Feb. 4, 1913 |
| 1,201,104 | Ruckstuhl | Oct. 10, 1916 |
| 1,233,919 | Rogan | July 17, 1917 |
| 1,317,607 | Williamson | Sept. 30, 1919 |
| 1,510,809 | Sweetland | Oct. 7, 1924 |
| 1,967,310 | Kent | July 24, 1934 |
| 2,162,379 | Dole | June 13, 1939 |

OTHER REFERENCES

L. T. Chang, Native Method of Sugar Mfg. In Szechuan Bulletin of the Nat. Bureau of Ind. Res., Ministry of Economic Affairs, No. 282, page 13, May 30, 1941.